(12) United States Patent
Bettcher, III et al.

(10) Patent No.: US 11,865,903 B2
(45) Date of Patent: Jan. 9, 2024

(54) ARTICULATING ANTI-RATTLE DEVICE FOR A RAMP

(71) Applicant: THE BRAUN CORPORATION, Winamac, IN (US)

(72) Inventors: Robert E. Bettcher, III, Winamac, IN (US); Kenneth Edward Peterson, Winamac, IN (US)

(73) Assignee: The Braun Corporation, Winamac, IN (US)

(*) Notice: Subject to any disclaimer, the term of this patent is extended or adjusted under 35 U.S.C. 154(b) by 0 days.

(21) Appl. No.: 17/751,021

(22) Filed: May 23, 2022

(65) Prior Publication Data

US 2022/0371412 A1 Nov. 24, 2022

Related U.S. Application Data

(60) Provisional application No. 63/192,155, filed on May 24, 2021.

(51) Int. Cl.
| | | |
|---|---|---|
| B60J 5/04 | (2006.01) | |
| B60J 5/06 | (2006.01) | |
| A61G 3/06 | (2006.01) | |
| B60P 1/43 | (2006.01) | |
| B62D 25/04 | (2006.01) | |
| F16F 15/06 | (2006.01) | |

(52) U.S. Cl.
CPC ............ *B60J 5/06* (2013.01); *B60J 5/047* (2013.01); *B60P 1/431* (2013.01); *B62D 25/04* (2013.01); *F16F 15/06* (2013.01)

(58) Field of Classification Search
CPC .............. B60J 5/06; A61G 3/06; A61G 3/061
USPC .............. 296/65.04, 155; 414/522, 537, 921
See application file for complete search history.

(56) References Cited

U.S. PATENT DOCUMENTS

| | | | | |
|---|---|---|---|---|
| 3,874,527 A | * | 4/1975 | Royce | B60P 1/4407 296/61 |
| 5,921,613 A | * | 7/1999 | Breunig | B60J 5/06 296/146.12 |
| 11,135,108 B2 | * | 10/2021 | Kim | B60P 1/435 |
| 2011/0027054 A1 | | 2/2011 | Hansen | |

FOREIGN PATENT DOCUMENTS

| | | |
|---|---|---|
| CN | 212447057 U | 2/2021 |
| DE | 102019204766 A1 * | 10/2020 |
| WO | 2016081268 A1 | 5/2016 |

OTHER PUBLICATIONS

International Search Report and Written Opinion, dated Sep. 5, 2022, PCT/US2022/030510.

* cited by examiner

*Primary Examiner* — Dennis H Pedder
(74) *Attorney, Agent, or Firm* — Daniel Tallitsch (57) ABSTRACT

A motor vehicle includes a ramp, a sliding door that when open allows the ramp to be deployed from the vehicle, and an anti-rattle device to prevent or reduce rattling of the ramp against the door or other components of the vehicle when the ramp is in a stowed position. The anti-rattle device includes an arm pivotable relative to the door and a roller rotatably coupled to the arm, spaced apart from the door, and configured to contact the ramp.

20 Claims, 9 Drawing Sheets

ARTICULATING ANTI-RATTLE DEVICE FOR A RAMP

CROSS-REFERENCE TO RELATED APPLICATIONS

This application claims priority to U.S. Provisional Patent Application No. 63/192,155, filed on May 24, 2021, the content of which is incorporated herein by reference.

This application is also filed concurrently with PCT Patent Application No. PCT/US22/30510, filed on May 23, 2022, the content of which is incorporated herein by reference.

FIELD OF THE DISCLOSURE

The present disclosure relates to an anti-rattle device for a vehicle access device including but not limited to a ramp and a lift, and in one embodiment, to an articulating anti-rattle device for a vehicle access device in a motor vehicle.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van is retrofitted with a ramp to enable a physically limited individual using a wheelchair to enter and exit the vehicle without the assistance of another individual.

Other known products for retrofitting a vehicle, such as a van or sport utility vehicle, include wheelchair lifts, lift platforms, and lowered floor surfaces. Once inside the van, the individual who uses the ramp or other passenger-entry-assist (or vehicle access) device is located in a rear passenger compartment of the van adjacent to or behind the assisted entrance. The ramp or other device may rattle, rock, or vibrate against the rear passenger door or another adjacent component of the van.

In one known retrofitted van, the sliding side door moves toward the back of the vehicle to open a passenger entrance as well as to provide access to a ramp located adjacent the door. Consequently, what is needed is a modification to an OEM vehicle which reduces or eliminates the rattle, rock, or vibration of the ramp against the door or other adjacent component. What is also needed is an anti-rattle device that will function effectively with repeated use without the need for frequent replacement. What is also needed is an anti-rattle device that will not prevent the sliding side door from opening to its fully open position.

In another known retrofitted van, the ramp stows underneath the floor of the motor vehicle, whereby the ramp may rattle, rock, or vibrate against its frame, the underside of the ramp cover or vehicle floor, or other adjacent component of the van. What is needed is an anti-rattle device that will function effectively with repeated use without the need for frequent replacement. What is also needed is an anti-rattle device that will not prevent the ramp from deploying to its fully open position.

In yet another known retrofitted van, the ramp stows adjacent the rear door of a rear entry motor vehicle, whereby the ramp may rattle, rock, or vibrate against the rear door or other adjacent component of the van. What is needed is an anti-rattle device that will function effectively with repeated use without the need for frequent replacement. What is also needed is an anti-rattle device that will not prevent the rear door from opening or the ramp from deploying.

SUMMARY

In an illustrative embodiment, a motor vehicle comprises: a passenger opening defined between a B-pillar and a C-pillar of the motor vehicle, wherein the passenger opening provides access to an interior of the motor vehicle. The motor vehicle further comprises: a door slidable between a closed position, a partially open position, and a fully open position, wherein the door in the fully open position provides access to the passenger opening; and a ramp movable between a deployed position and a stowed position, wherein when the ramp is in a stowed position and the door is in the closed position, the ramp is located in the interior of the vehicle adjacent the door. The motor vehicle further comprises, an anti-rattle device including: an arm pivotable relative to the door; and a roller rotatably coupled to the arm and spaced apart from the door. The arm is disposed at a first angle relative to the door when the door is in the closed position and a second angle relative to the door, different than the first angle, when the door is in the partially open position. In some embodiments, the second angle is less than the first angle.

In some embodiments, the ramp is spaced apart from the passenger opening a first distance when the door is in the closed position and a second distance when the door is in the partially open position. The second distance is less than the first distance.

In some embodiments, the roller is positioned in a cavity of the C-pillar when the door is in the fully open position. In some embodiments, the arm is positioned at a third angle relative to the door, different than the first angle, when the door is in the fully open position. In some embodiments, the third angle is the same as the second angle.

In some embodiments, the anti-rattle device includes: a spring coupled to the arm and configured to bias the arm towards a position in which the arm is disposed at the second angle relative to the door. In some embodiments, the anti-rattle device includes: a bracket fixedly coupled to the door. The arm is pivotably coupled to the bracket; and the spring is coupled at a first end to the arm and at a second end to the bracket.

In some embodiments, the ramp includes a raised edge. During movement of the door to the closed position, contact between the roller and the raised edge moves the arm from the second angle to the first angle relative to the door.

In another illustrative embodiment, a motor vehicle comprises, a passenger opening defined between a B-pillar and a C-pillar of the motor vehicle, wherein the passenger opening provides access to an interior of the motor vehicle. The motor vehicle further comprises: a door slidable between a closed position, a partially open position, and a fully open position, wherein the door provides access to the passenger opening; and a ramp movable between a deployed position and at least one stowed position in the interior of the vehicle and adjacent the door. The motor vehicle further comprises an anti-rattle device including: an arm pivotable relative to the door about a pivot axis of the arm; and a roller coupled to the arm. The roller rotates relative to the door about the pivot axis of the arm as the door moves between the partially open position and the closed position.

In some embodiments, the roller is coupled to the arm at a pivot axis of the roller; and the roller rotates about the pivot axis of the roller as the door moves between the partially open position and the closed position. In some embodiments, the ramp is spaced apart from the passenger opening a first distance when the door is in the closed position and a second distance when the door is in the partially open position, the second distance being less than the first distance.

In some embodiments, the anti-rattle device includes a spring coupled to the arm; and the spring biases the arm away from the C-pillar towards the B-pillar when the door is in the fully open position. In some embodiments, when the door is moved to the closed position, contact between the roller and the ramp rotates the roller about the pivot axis of the arm against a bias force of the spring.

In some embodiments, the arm includes a first slat, a second slat, and a crossbar extending between the slats. The roller is positioned between the slats; and a first end of the spring is coupled to the cross bar. In some embodiments, the anti-rattle device includes: a bracket fixedly coupled to the door. The arm is pivotably coupled to the bracket at the pivot axis of the arm, and a second end of the spring is coupled to the bracket. In some embodiments, the roller is positioned in a cavity of the C-pillar when the door is in the fully open position.

In another illustrative embodiment, a method of operating a door of a motor vehicle including a ramp located adjacent the door comprises: moving the door away from a fully open position, in which anti-rattle device extends at a first angle relative to the door and does not contact the ramp; and moving the door, simultaneously, towards a closed position, in which the anti-rattle device extends at a second angle relative to the door and contacts the ramp.

In some embodiments, moving the door away from a fully open position includes: moving an end of the door, at which the anti-rattle device is coupled, away from a C-pillar towards a B-pillar of the motor vehicle. In some embodiments, moving the door towards a closed position includes engaging an end of the anti-rattle device opposite the door with the ramp.

In some embodiments, engaging an end of the anti-rattle device opposite the door with the ramp includes: urging the end of the anti-rattle device opposite the door away from the B-pillar towards the C-pillar.

In yet another illustrative embodiment, a motor vehicle may comprise: a vehicle access device movable between a deployed position and a stowed position, wherein a space separates the vehicle access device from a vehicle structure in the stowed position; and an anti-rattle device movable from a stowage condition to a deployed condition wherein the anti-rattle device is disposed the space and urges the vehicle access device away from the vehicle structure.

In some embodiments, the anti-rattle device may include an arm moveable relative to the vehicle structure and a spring coupled to the arm. In some embodiments, the arm is disposed in a first position in its deployed condition and is disposed in a second position in its stowed condition, the first position being different from the second position. In some embodiments, the spring is configured to bias the arm toward the second position.

In some embodiments, the vehicle access device is a ramp and the vehicle structure is a door movable between a closed position and an open position. In some embodiments, when the ramp is in the stowed position and the door is in the closed position, the ramp is located in the interior of the vehicle adjacent the door and the arm engages with the ramp and moves from the second position to the first position as the door moves from the open position to the closed position.

In some embodiments, the anti-rattle device comprises a bladder that is deflated in the stowage condition and inflated in the deployed condition.

In some embodiments, the access device is a ramp. In some embodiments, the ramp is part of an in-floor ramp assembly. In some embodiments, the vehicle structure is the underside of a cover for the in-floor ramp assembly. In some embodiments, the vehicle structure is the underside of the vehicle floor.

In some embodiments, the ramp is disposed above a floor of the vehicle in its stowed position. In some embodiments, the vehicle surface is a door of the vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
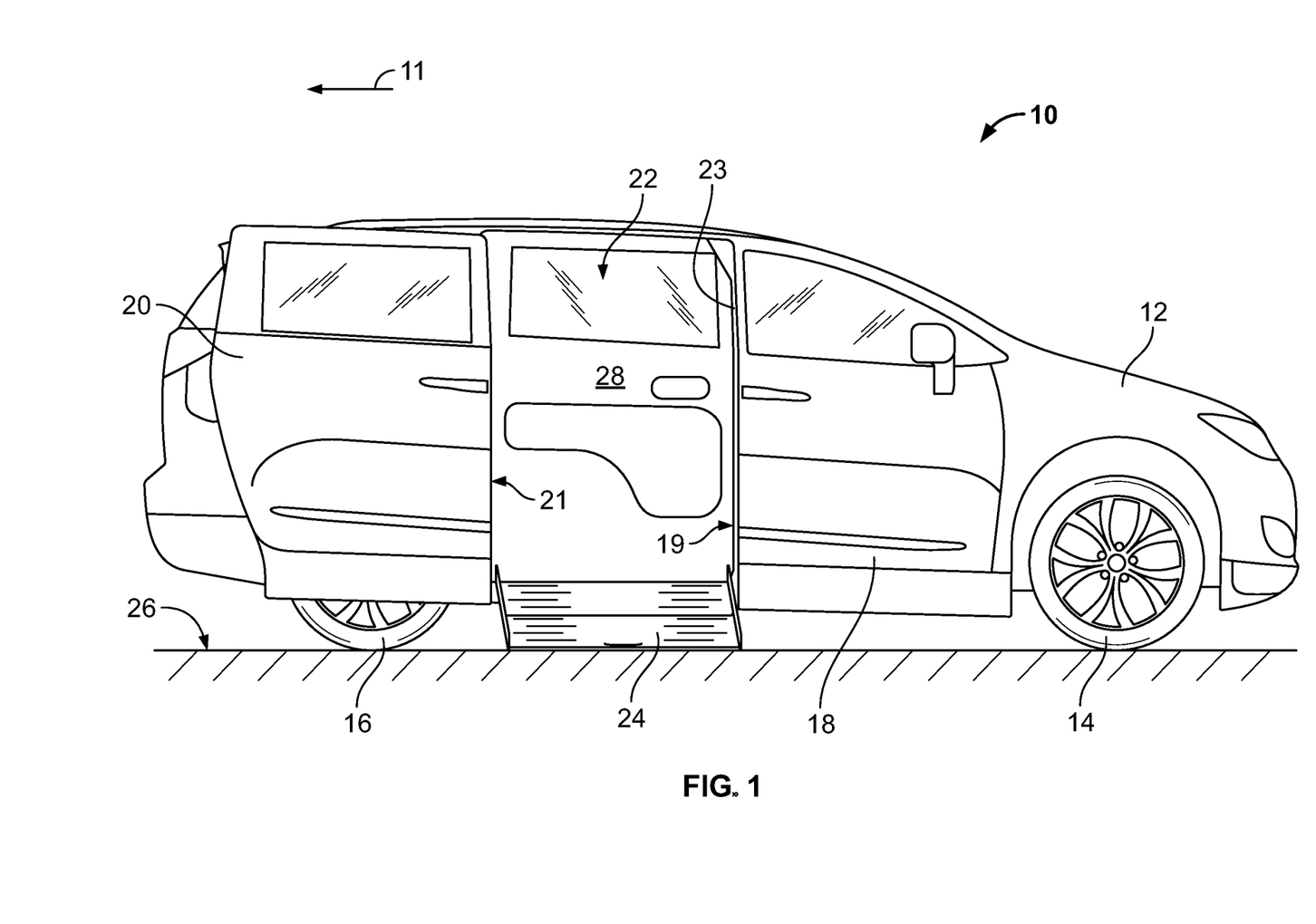
FIG. 1 illustrates a side view of a passenger vehicle including a door shown in a fully open position and a ramp that provides access to an interior of the vehicle between a B-pillar and a C-pillar of the vehicle.

FIG. 1 illustrates a vehicle 10, commonly known as a passenger van, available from any number of United States and foreign manufacturers. In the illustrative embodiment, the vehicle 10 includes a unibody construction, but other vehicles having a frame on body construction, are also included in the present disclosure. Consequently, the use of vehicle herein includes all types and kinds of vehicles with a body on frame construction, a unibody construction, or other constructions. In addition, while the passenger van 10 is illustrated in FIG. 1, the present disclosure is directed to all passenger vehicles carrying one or more passengers.

The vehicle 10 includes a body 12 operatively coupled to front wheels 14 and rear wheels 16. The vehicle 10 includes a unibody construction, wherein the body 12 includes sheet metal skin support by a frame as is understood by one skilled in the art. A first passenger side door 18 is located between the front wheels 14 and rear wheels 16 and provides access to a passenger for sitting in a front seat of the vehicle adjacent to a driver.

Figure 2:
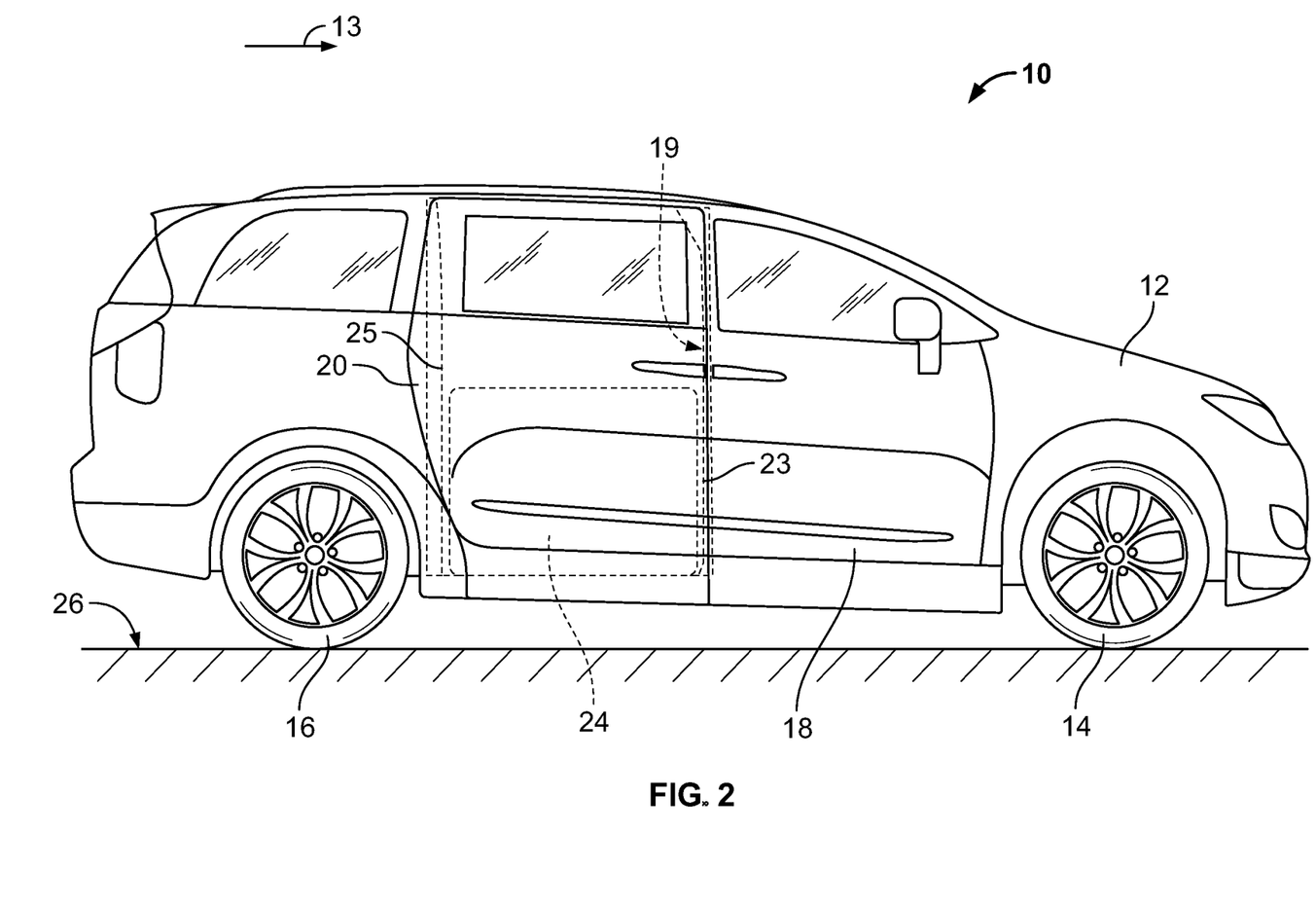
FIG. 2 illustrates another side view of the passenger vehicle showing the ramp in a stowed position in the interior of the vehicle adjacent the door.

The vehicle 10 includes a second passenger side door 20, shown in a fully open position, coupled to the unibody frame through a sliding mechanism. In the illustrative embodiment, the door 20 slides open, laterally, in a rearward direction as shown by the arrow 11, but other doors that are open by pivoting or some combination of pivoting and sliding laterally are included in the present disclosure. In some embodiments, the sliding mechanism is modified to slide along tracks to increase the size of an opening 22 to the interior. The opening 22, whether increased in size or standard-sized, provides access to a passenger seated in a wheelchair or other assisted mobility devices. The opening 22, sometimes referred to as a passenger opening 22, is defined on the sides thereof by an edge 19 of a B-pillar 23 and by an edge 21 of the door 20. In some embodiments, depending on the slide mechanism and/or the construction of the door 20, one side of the opening 22 may be defined by an edge of a C-pillar 25 (FIG. 2) rather than the edge 21 of the door 20. The B-pillar 23 and C-pillar 25 are shown in phantom in FIG. 2. As suggested by FIG. 2, the door 20 slides to a closed position, laterally, in a forward direction as shown by the arrow 13.

In the illustrative embodiment, the vehicle is further modified, to include a ramp 24 which provides rolling access of a wheelchair from the ground 26 into an interior 28 of the vehicle 10. The ramp 24 is installed at the opening 22 and is movable between the interior of the vehicle 10 where it is stored (i.e. one or more stowed positions) and the exterior of the vehicle 10 for providing wheelchair access (i.e. a deployed position). Although the invention is described and shown in the context of a ramp or other access device installed adjacent a side-entry vehicle, it is contemplated that ramps or other access devices installed adjacent a rear-entry vehicle are included in present disclosure.

In known modified vehicles, such as the modified van of FIG. 1, the middle row of seats is removed from the manufacturer supplied vehicle to enable access to a wheelchair supporting a passenger. Once the wheelchaired passenger moves into the interior 28 of the vehicle 10, the passenger or caregiver locates the wheelchair in the middle portion of the interior 28 behind the driver and passenger seats of the front row. In some instances, the wheelchaired passenger may move from the wheelchair to the driver's position or to the front row passenger position. As used herein, a wheelchaired passenger is used to indicate that the individual is making use of a wheelchair, whether that use is temporary or permanent.

Figure 3:
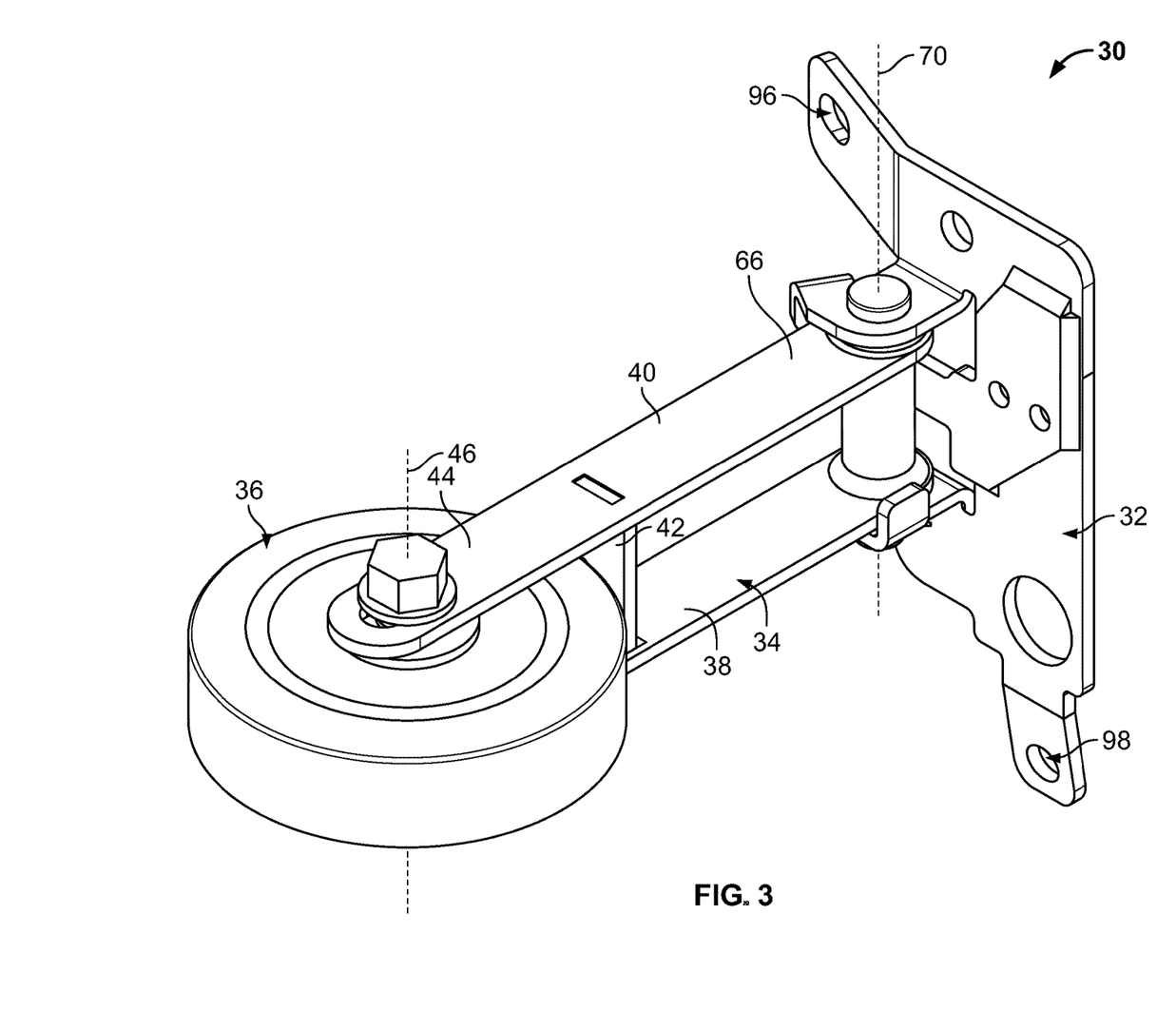
FIG. 3 illustrates a first front perspective view of a first embodiment of an anti-rattle device coupleable to the door of the vehicle.
Figure 4:
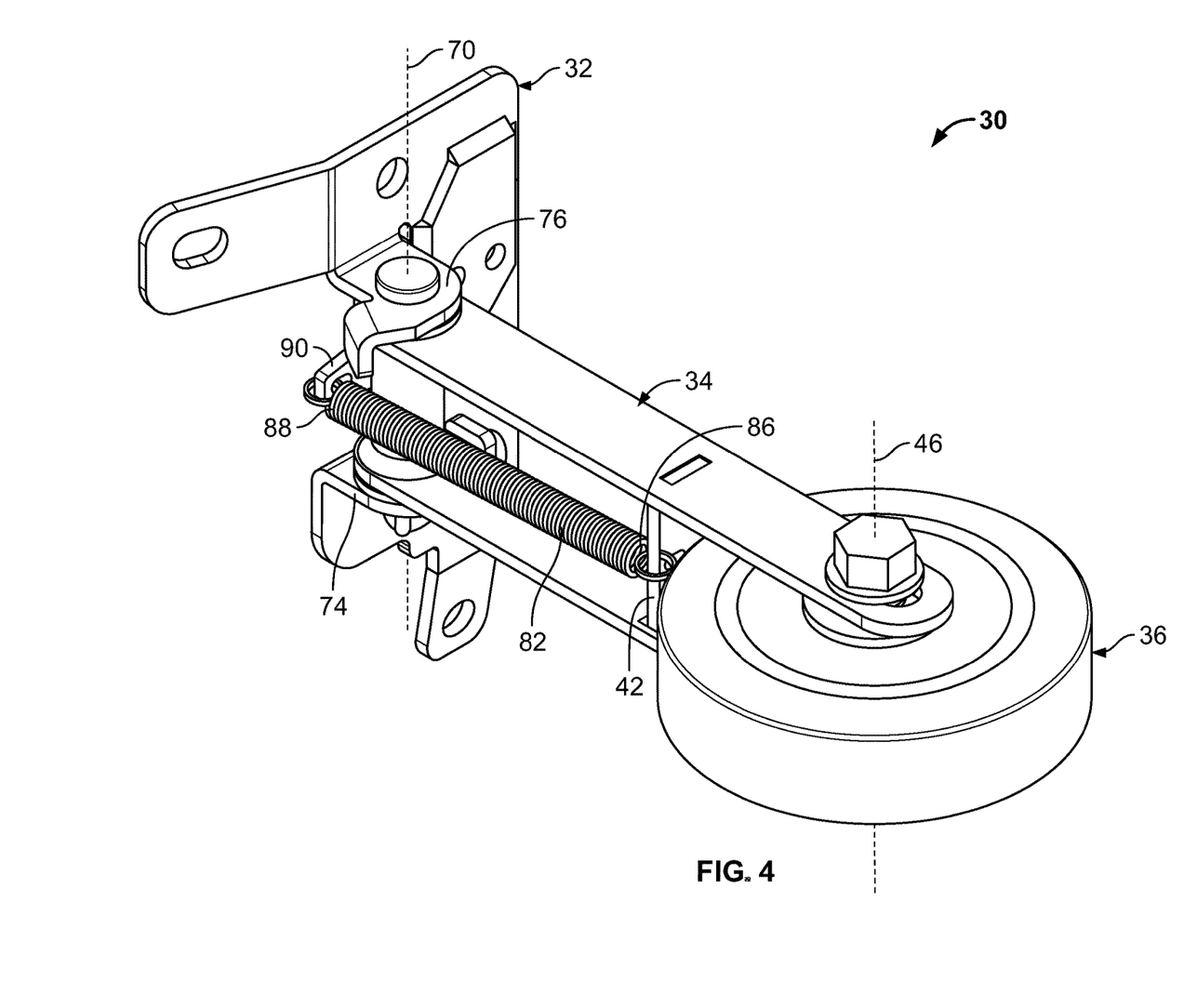
FIG. 4 illustrates a second front perspective view of the anti-rattle device of FIG. 3 showing a spring of the anti-rattle device.
Figure 5:
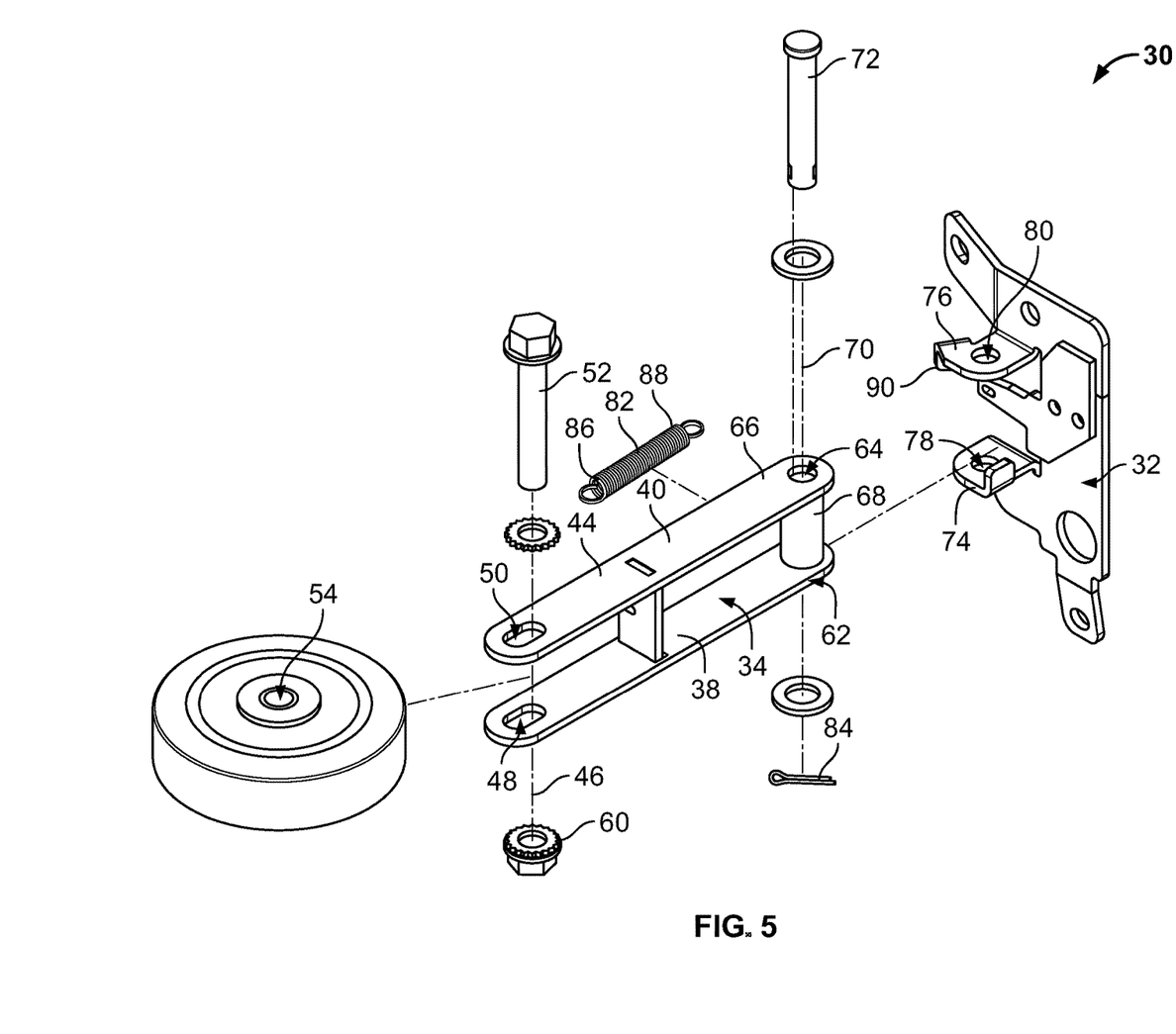
FIG. 5 illustrates an exploded perspective view of the components of the anti-rattle device of FIGS. 3-4.
Figure 6:
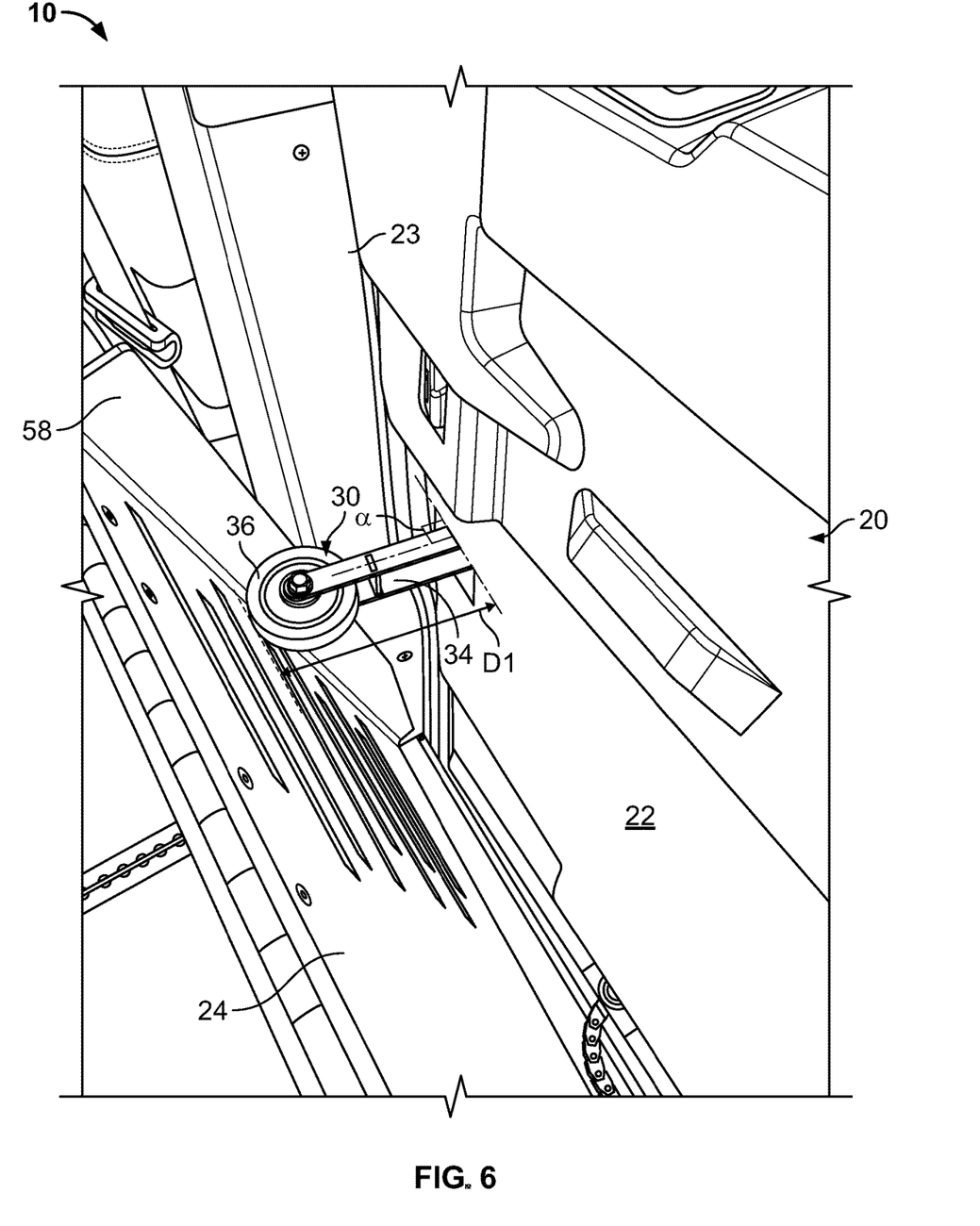
FIG. 6 illustrates a perspective view of the door viewed from within the interior of the vehicle showing the door in a closed position with the anti-rattle device in a first position relative to the door adjacent the B-pillar.
Figure 7:
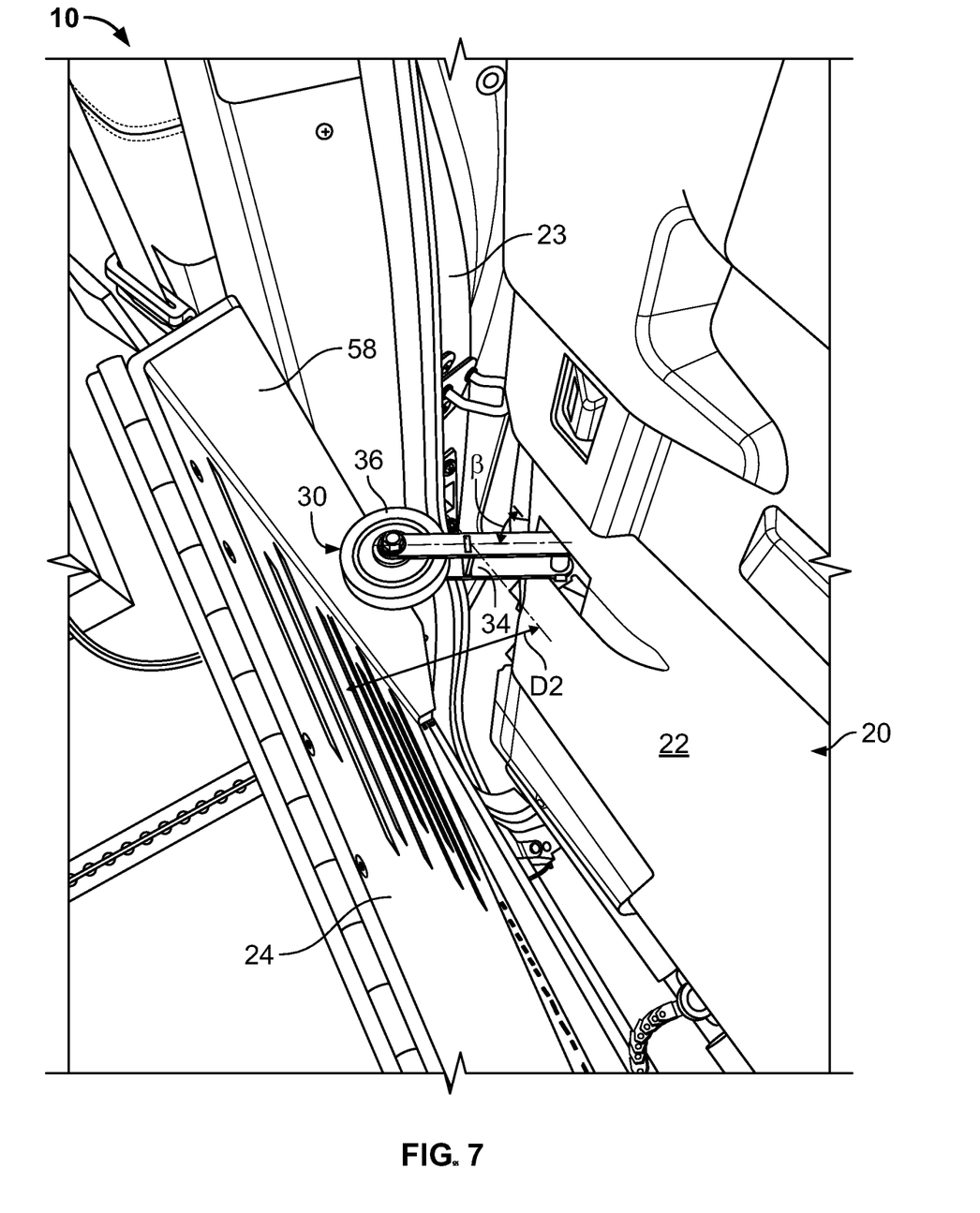
FIG. 7 illustrates a perspective view of the door viewed from the location as FIG. 6 showing the door in a partially open position with the anti-rattle device in a second position relative to the door.
Figure 8:
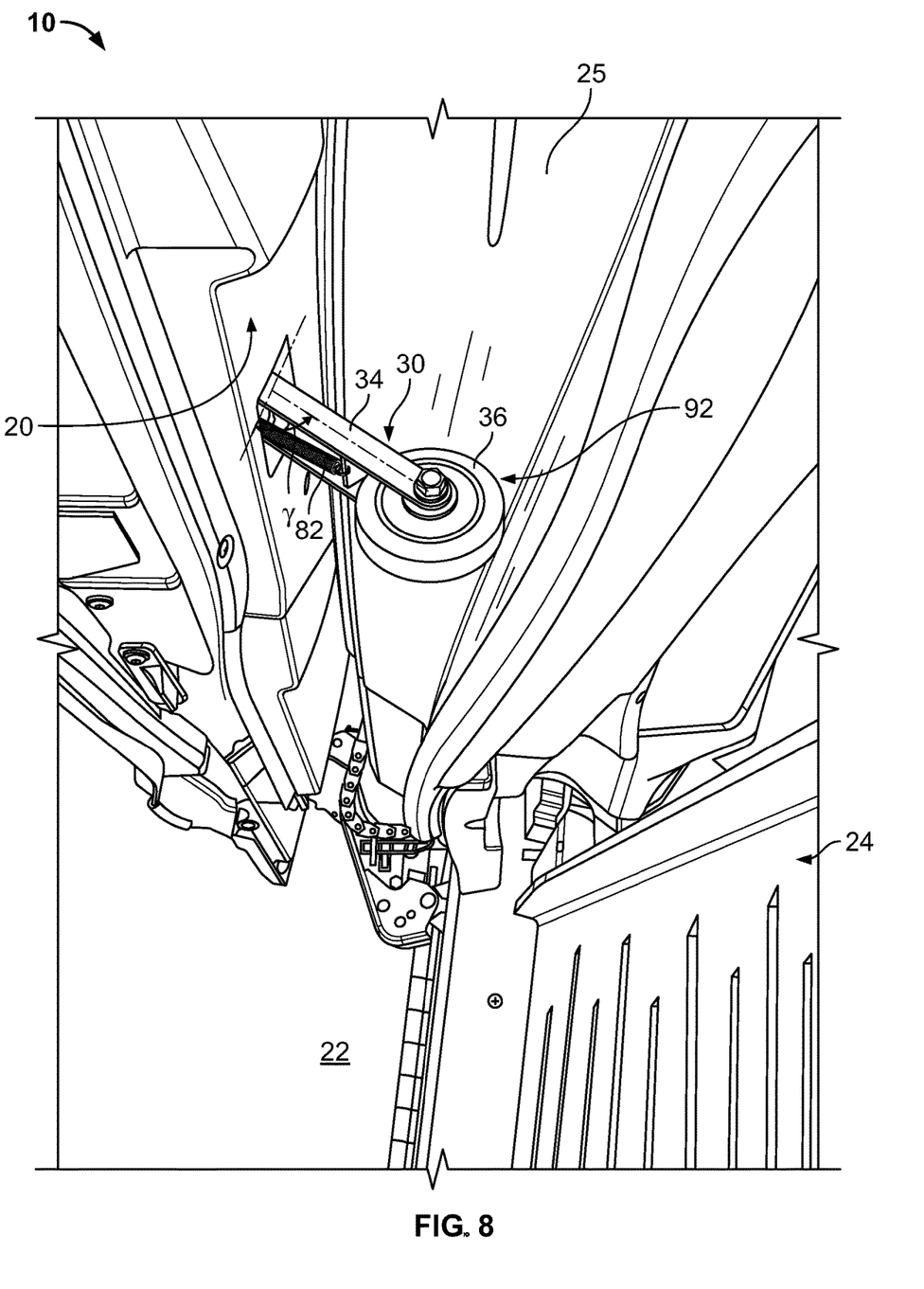
FIG. 8 illustrates a perspective view of the door in a fully open position with a roller of the anti-rattle device positioned in a cavity of the C-pillar.

A first embodiment of an anti-rattle device 30 for the vehicle 10 is shown in FIGS. 3-5. As shown in FIGS. 6-8, the anti-rattle device 30 may be coupled to the door 20 and urged against the ramp 24 when the door 20 is in the fully closed position to prevent or reduce rattling of the ramp 24 during operation of the vehicle 10.

As shown in FIGS. 3-5, the anti-rattle device 30 includes a bracket 32, an arm 34, and a roller 36. In the illustrative embodiment, the bracket 32 includes a pair of door-abutting slots 96, 98 configured to receive fasteners to secure the bracket 32 to the door 20. Additional slot or apertures may be included in the bracket 32 as shown. The arm 34 includes a first slat 38, a second slat 40, and a crossbar 42 extending between the slats 38, 40. The roller 36 is positioned between the slats 38, 40 adjacent the crossbar 42 at a distal end 44 of the arm 34. Therefore, the roller 36 is spaced apart from the bracket 32 and from the door 20 when the bracket 32 is coupled to the door 20. The arm 34 also includes a proximal end 66 opposite the distal end 44, and the arm 34 is coupled to the bracket at its proximal end 66.

As suggested in FIGS. 3-4, the roller 36 is rotatable about a pivot axis 46 defined at the distal end 44 of the arm 34. As shown in FIG. 5, the slats 38, 40 of arm 34 each include a slot 48, 50, respectively, defined at the distal end 44 of the arm 34. The slots 48, 50 are aligned with the pivot axis 46 of the roller 36. The anti-rattle device 30 further include a first fastener 52 configured to be inserted in the slots 48, 50 and inserted through a circular opening 54 defined in the roller 36 to secure the roller to the arm 34. As shown in FIG. 5, the slots 48, 50 may be embodied as elongated slots having a length that is greater than the diameter of the first fastener 52. As a result, the first fastener 52 may be moved within the slots 48, 50 to a position in which the roller 36, which is coupled to the fastener 52, contacts a side rail 58 of the ramp (FIG. 6) when the door 20 is moved from a partially open to the closed position (see FIG. 6). A threaded nut, e.g., nut 60 in FIG. 5, or other locking device may secure the first fastener 52 in its position within the slots 48, 50. Contact between roller 36 and the side rail 58 of the ramp 24 will be described in more detail below.

As shown in FIG. 5, the slats 38, 40 of the arm 34 each include an opening 62, 64, respectively, defined at the proximal end 66 of the arm 34. The arm 34 further includes a sleeve 68 extending between the openings 62, 64 and a pivot axis 70 aligned with the openings 62, 64 and the sleeve 68. Referring still to FIG. 5, in the illustrative embodiment, the bracket 32 includes a first flange 74 and a second flange 76. The flanges 74, 76 extend outwardly from the bracket 32 in a direction away from the door 20 when the bracket 32 is coupled to the door 20. Each flange 74, 76 includes an opening 78, 80, respectively, and the openings 78, 80 are aligned with one another.

The flanges 74, 76 are spaced apart from one another a sufficient distance such that the slats 38, 40 are positioned between the flanges 74, 76, with the flange openings 78, 80 aligned with the slat openings 62, 64. The anti-rattle device 30 further includes a second fastener 72 configured to be inserted in the openings 62, 64, 78, 80, and the through sleeve 68. A pin, e.g., pin 84 in FIG. 5, or other locking device may secure the second fastener 72 in its position within the openings and sleeve 68. In this configuration, the second fastener 72 is positioned along the pivot axis 70 and secures the arm 34 to the bracket 32. The arm 34 is therefore pivotable about the pivot axis 70 relative to the bracket 32 and relative to the door 20 when the bracket 32 is coupled to the door 20. Because the roller 36 is positioned at the distal end 44 of the arm 34, and the arm 34 is pivotable at its proximal end 66 relative to the bracket 32 and the door 20, the roller 36 may be described as spaced apart from and rotatable relative to the door 20.

It should be appreciated that, while an exemplary embodiment of an anti-rattle device 30 is shown in FIGS. 3-5, the roller 36 may be rotatably coupled to the arm 34 in alternative arrangements, and likewise, the arm 34 may be pivotably coupled to the bracket 32 or the door 20 in alternative arrangements.

As shown in FIGS. 4-5, the anti-rattle device further includes a spring 82, which is illustrative shown as a tension spring. The spring 82 includes a first end 86 and a second end 88. The first end 86 of the spring 82 is coupled to the crossbar 42, and the second end 88 of the spring 82 is coupled to the bracket 32. In the illustrative embodiment, the bracket 32 includes a projection 90 that extends perpendicular to the flanges 74, 76. In other words, the projection 90 of the bracket extends laterally from a body of the bracket 32 toward the B-pillar 23, e.g., in the forward direction 13, when bracket 32 is coupled to the door 20. The spring 82, therefore, urges or biases the arm 34 toward the B-pillar 23 of the vehicle 10 (see FIGS. 7-8).

FIG. 6 illustrates the door 20 in the closed position and the anti-rattle device 30 fixedly coupled to the door 20. As shown in FIG. 6, when the door 20 is in the closed position, the arm 34 of the anti-rattle device 30 is disposed at a first angle $\alpha$ relative to the door 20. Further, when the door 20 is in the closed position, and the ramp 24 is in a stowed position, the ramp 24 is spaced apart a first distance D1 from the passenger opening 22. As suggested by FIG. 6, as the door is moved toward the closed position, i.e. toward the B-pillar 23, the roller 36 contacts the side rail 58 of the ramp 24. Engaging or contacting the side rail 58 causes the roller 36 to rotate about the pivot axis 46 in a clockwise direction. In the illustrative embodiment, the roller 36 may seat itself in the corner of the ramp 24 defined by the side rail 58 and the floor of the ramp 24 when the door 20 is in the closed position. When the roller 36 is in contact with the side rail 58 and the door 20 is moved further towards the closed position, the bias (i.e. tension force) of the spring 82 is overcome such that the arm 34 of the anti-rattle device 30 is pivoted counterclockwise relative to the door 20. In some embodiments, the distal end 44 of the arm 32 may be moved away from the B-pillar 23 toward the C-pillar 25 as the door 20 is moved toward to the closed position.

As suggested by FIGS. 6 and 7, when the door 20 is moved from the closed position to the partially open position, i.e. toward the C-pillar 25, the roller 36 disengages with the ramp 24, and the bias (i.e. tension force) of the spring 58, unopposed, pivots the arm 34 clockwise relative to the door 20. In some embodiments, the distal end 44 of the arm 32 may be moved away from the C-pillar 25 towards the B-pillar 23 as the door 20 is moved from the closed position to the partially open position.

As shown in FIG. 7, when the door 20 is in the partially open position, the arm 34 of the anti-rattle device 30 is disposed at a second angle $\beta$ relative to the door 20. The angle $\beta$ is less than the angle $\alpha$. Further, when the door 20 is in the partially open position, the ramp 24 is spaced apart a second distance D2 from the passenger opening 22, and the distance D2 is less than the distance D1.

In FIG. 8, the door 20 is shown in the fully open position. When the door 20 is in the fully open position, the spring 82 biases the arm 34 of the anti-rattle device 30, such that the arm 34 is disposed at a third angle $\gamma$ (which in some embodiments is equal to the second angle $\beta$) relative to the door 20. In this configuration, when the door 20 is in the fully open position, the roller 36 is positioned in a cavity 92 defined in the C-pillar 25 of the vehicle 10.

It should be appreciated that if the arm 34 were not pivotable, and were instead fixed, relative to the door 20, then the door 20 would be prevented from moving to the fully open position because the arm 34 would contact the C-pillar 25 prior to the door 20 reaching the fully open position. On the other hand, if the arm 34 were fixed relative to the door 20 and shifted laterally forward on the door 20 so that the door 20 could be moved to the fully open position without the arm 34 interfering with the C-pillar 25, then the roller 36 would contact the ramp 24 on the same portion of the roller 36 with each close of the door 20 causing unsustainable wear on the roller 36. Further, as is commonly the case with conventional anti-rattle devices, a fixed configuration of the anti-rattle device relative to the door results in difficulty with consistently replicating proper placement of the device (e.g., so that the roller consistently contacts the ramp in the proper location of the ramp). Consistently achieving proper engagement between the anti-rattle device and the ramp is even more challenging with convention device when considering that the device must sufficiently operate in each different vehicle and throughout continued, long term use of the sliding door of the vehicle. These problems can be overcome with the anti-rattle device 30 and related description herein.

Figure 9:
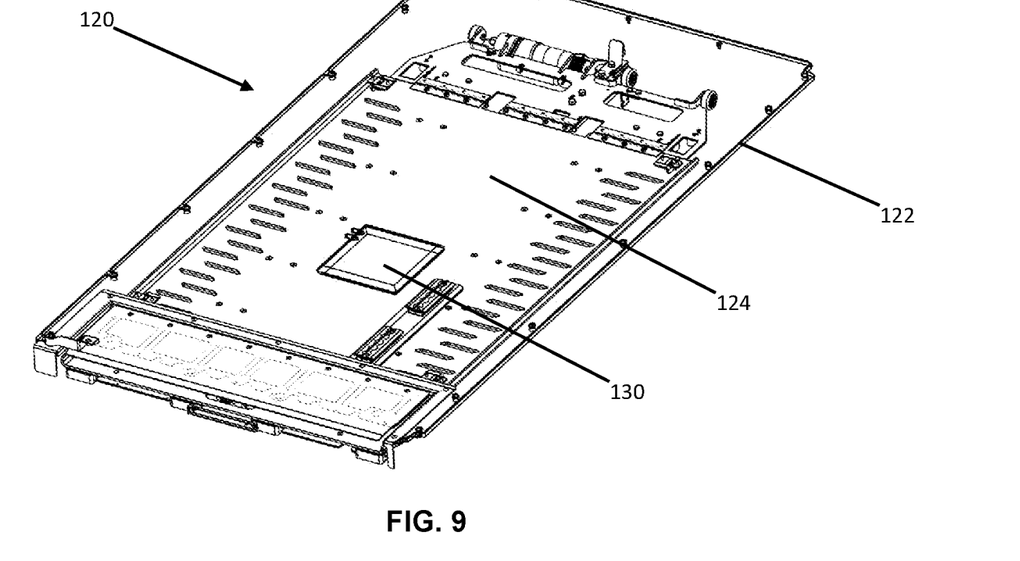
FIG. 9 illustrates a perspective view of a second embodiment of an anti-rattle device coupled to the underside of a cover for an in-floor ramp.
Figure 10:
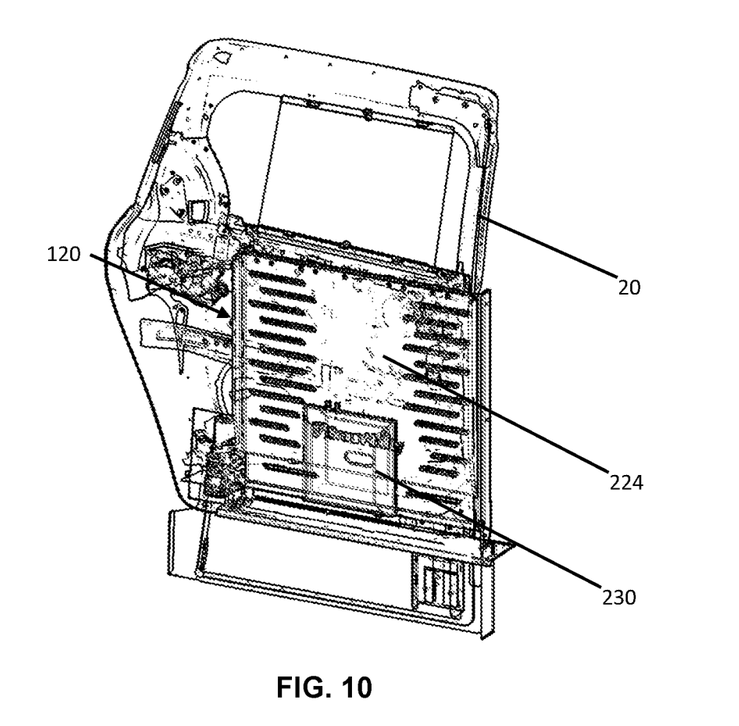
FIG. 10 illustrates a perspective view of a third embodiment of an anti-rattle device coupled to the door of a vehicle.

A second embodiment of an anti-rattle device 130 for the vehicle 10 is shown in FIG. 9. The anti-rattle device 130 may be coupled to or adjacent the ramp 124 of an in-floor ramp assembly 120 to prevent or reduce rattling of the ramp 124 during operation of the vehicle 10. In the illustrative embodiment, the anti-rattle device 130 is disposed in the space between the ramp 124 and the underside of the cover 122 (shown transparent) of the in-floor ramp assembly 120, although it is contemplated that the anti-rattle device 130 may be disposed in the space between the ramp 124 and any other adjacent structure, including but not limited to frame members of the in-floor ramp assembly 120 or the underside of the vehicle floor. The anti-rattle device 130 may take the form of or comprise an inflatable bladder into which a compressible or incompressible fluid, such as but not limited to air or hydraulic fluid, may be injected via a pump, a compressor, or similar device to increase the size of the bladder. In a stowed condition, the bladder is deflated so as to not interfere with operation of the ramp 124 during deployment and stowage operations. Once the ramp 124 is placed in its stowed position, the bladder can be inflated, whereby the anti-rattle device 130 will span the space between the anti-rattle device 130 and the underside of the cover 122, thereby urging the two away from each other.

A third embodiment of an anti-rattle device 230 for the vehicle 10 is shown in FIG. 9. The anti-rattle device 230 may be coupled to or adjacent the ramp 224 of an above-floor ramp assembly 220 to prevent or reduce rattling of the ramp 224 during operation of the vehicle 10. In the illustrative embodiment, the anti-rattle device 230 is disposed in the space between the ramp 224 and the door 20 (shown transparent) of the vehicle, although it is contemplated that the anti-rattle device 230 may be disposed in the space between the ramp 224 and any other adjacent structure, including but not limited to frame members of the above-floor ramp assembly 220 or a pillar of the vehicle. The anti-rattle device 230 may take the form of or comprise an inflatable bladder into which a compressible or incompressible fluid, such as but not limited to air or hydraulic fluid, may be injected via a pump, a compressor, or similar device to increase the size of the bladder. In a stowed condition, the bladder is deflated so as to not interfere with operation of the ramp 224 during deployment and stowage operations. Once the ramp 224 is placed in its stowed position and the door 20 is closed, the bladder can be inflated, whereby the anti-rattle device 230 will span the space between the anti-rattle device 230 and the door 20, thereby urging the two away from each other.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are initial to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A motor vehicle, comprising:
a passenger opening providing access to an interior of the motor vehicle;
a door movable between a closed position, a partially open position, and a fully open position, wherein the door in the fully open position provides access to the passenger opening;
a ramp movable between a deployed position and a stowed position, wherein when the ramp is in the stowed position and the door is in the closed position, the ramp is located in the interior of the vehicle adjacent the door;
an anti-rattle device contacting the ramp when the door is in the closed position, the anti-rattle device including:
an arm pivotable relative to the door; and
a roller rotatably coupled to the arm and spaced apart from the door;
wherein the arm is disposed at a first angle relative to the door when the door is in the closed position and a second angle relative to the door, different than the first angle, when the door is in the partially open position.

2. The motor vehicle of claim 1, wherein the second angle is less than the first angle.

3. The motor vehicle of claim 1, wherein the ramp is spaced apart from the passenger opening a first distance when the door is in the closed position and a second distance when the door is in the partially open position.

4. The motor vehicle of claim 3, wherein the second distance is less than the first distance.

5. The motor vehicle of claim 1, wherein the passenger opening is defined between a B-pillar and a C-pillar of the motor vehicle and wherein the roller is positioned in a cavity of the C-pillar when the door is in the fully open position.

6. The motor vehicle of claim 5, wherein the arm is positioned at a third angle relative to the door, different than the first angle, when the door is in the fully open position.

7. The motor vehicle of claim 2, wherein the anti-rattle device includes:
a spring coupled to the arm and configured to bias the arm towards a position in which the arm is disposed at the second angle relative to the door.

8. The motor vehicle of claim 7, wherein the anti-rattle device includes:
a bracket fixedly coupled to the door;
wherein the arm is pivotably coupled to the bracket; and
wherein the spring is coupled at a first end to the arm and at a second end to the bracket.

9. The motor vehicle of claim 1, wherein the ramp includes a raised edge;
wherein, during movement of the door to the closed position, contact between the roller and the raised edge moves the arm from the second angle to the first angle relative to the door.

10. A motor vehicle, comprising:
a passenger opening providing access to an interior of the motor vehicle;
a door movable between a closed position, a partially open position, and a fully open position, wherein the door provides access to the passenger opening;
a ramp movable between a deployed position and at least one stowed position in the interior of the vehicle and adjacent the door;
an anti-rattle device contacting the ramp when the door is in the closed position, the anti-rattle device including:
an arm pivotable relative to the door about a pivot axis of the arm; and
a roller coupled to the arm;
wherein the roller rotates relative to the door about the pivot axis of the arm as the door moves between the partially open position and the closed position.

11. The motor vehicle of claim 10, wherein the roller is coupled to the arm at a pivot axis of the roller; and
wherein the roller rotates about the pivot axis of the roller as the door moves between the partially open position and the closed position.

12. The motor vehicle of claim 10, wherein the ramp is spaced apart from the passenger opening a first distance when the door is in the closed position and a second distance when the door is in the partially open position, the second distance being less than the first distance.

13. The motor vehicle of claim 10, wherein the passenger opening is defined between a B-pillar and a C-pillar of the motor vehicle;
wherein anti-rattle device includes a spring coupled to the arm; and
wherein the spring biases the arm away from the C-pillar towards the B-pillar when the door is in the fully open position.

14. The motor vehicle of claim 13, wherein when the door is moved to the closed position, contact between the roller and the ramp rotates the roller about the pivot axis of the arm against a bias force of the spring.

15. The motor vehicle of claim 13, wherein the arm includes a first slat, a second slat, and a crossbar extending between the slats;
wherein the roller is positioned between the slats; and
wherein a first end of the spring is coupled to the cross bar.

16. The motor vehicle of claim 13, wherein the anti-rattle device includes:
a bracket fixedly coupled to the door;
wherein the arm is pivotably coupled to the bracket at the pivot axis of the arm; and
wherein a second end of the spring is coupled to the bracket.

17. The motor vehicle of claim 1, wherein the passenger opening is defined between a B-pillar and a C-pillar of the motor vehicle and wherein the roller is positioned in a cavity of the C-pillar when the door is in the fully open position.

18. A method of operating a door of a motor vehicle including a ramp located adjacent the door, comprising:
   moving the door away from a fully open position, in which anti-rattle device extends at a first angle relative to the door and does not contact the ramp; and
   moving the door, simultaneously, towards a closed position, in which the anti-rattle device extends at a second angle relative to the door and contacts the ramp.

19. The method of claim 18, wherein moving the door away from a fully open position includes:
   moving an end of the door, at which the anti-rattle device is coupled, away from a C-pillar towards a B-pillar of the motor vehicle; and
   wherein moving the door towards a closed position includes engaging an end of the anti-rattle device opposite the door with the ramp.

20. The method of claim 19, wherein engaging an end of the anti-rattle device opposite the door with the ramp includes:
   urging the end of the anti-rattle device opposite the door away from the B-pillar towards the C-pillar.

* * * * *